Feb. 1, 1944.   C. A. FOX   2,340,740
TORQUE GAUGE
Filed Feb. 25, 1943

INVENTOR
CHARLES ADIN FOX
BY  *Em Harrington*
ATTORNEY

Patented Feb. 1, 1944

2,340,740

UNITED STATES PATENT OFFICE 2,340,740

TORQUE GAUGE

Charles Adin Fox, Oakland, Mo., assignor to James R. Kearney Corporation, St. Louis, Mo., a corporation of Missouri Application February 25, 1943, Serial No. 477,054

7 Claims. (Cl. 265—1)

This invention relates generally to apparatus for measuring torque and more specifically to such an apparatus adapted particularly for use in measuring the torque of the blades of propellers of air-borne craft, such, for instance, as airplanes, the predominant object of the invention being to provide an improved and extremely simple torque gauge through the use of which the torque of blades of propellers may be accurately measured.

As is well known to persons familiar with such matters, the blades of propellers of many modern airplanes are supported for adjustment in order that the pitch of said blades may be varied at the will of the pilot, such adjustment of the propeller blades being known as "feathering" the blades. The support of the propeller blades for such adjustment requires that said blades be provided with suitable bearings, and it is of the utmost importance for proper operation of an airplane so equipped that the friction between all of the blades of a propeller and their bearings be uniform.

Prior to this invention the torque of propeller blades was measured by applying to a blade an end portion of an elongated arm and attaching to, or supporting on, the opposite, free end portion of the elongated arm the required number of weights to apply to the blade the required torque to turn the blade. In this way the number of weights employed and the heaviness thereof indicated the torque required to turn the blade in inch-pounds. While this manner of measuring the torque of propeller blades was fairly accurate, it was objectionable in that provision had to be made for the safe keeping of numerous weights, and the transportation of such weights to widely separated plants and air fields where the torque of propeller blades was measured.

The improved torkue gauge disclosed herein eliminates the objection referred to above because of the fact that it includes no weights, the torque required to turn a propeller blade which is being tested, being indicated in inch-pounds by movement of an indicator relative to a suitably graduated dial which forms an integral part of the unitary structure. Also, although the improved torque gauge disclosed herein is extremely sensitive in its operation, it is of rugged construction and hence is able to withstand all the rough usage to which devices of its general type are frequently subjected.

Figure 1:
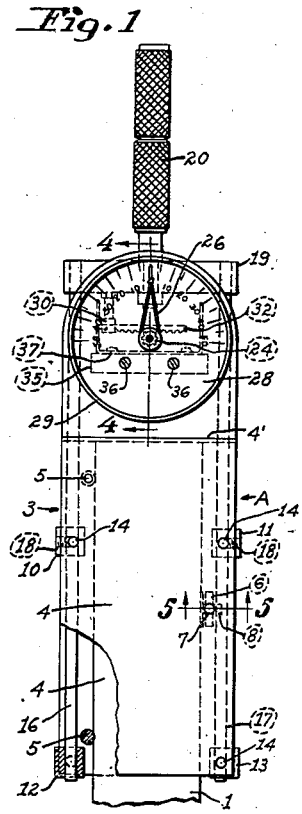
Fig. 1 is a plan view of the improved torque gauge, an intermediate portion thereof being broken away to permit of the structure being drawn to a large scale.

In the drawing, wherein is shown for the purpose of illustration, merely one embodiment of the invention, A designates the improved torque gauge generally. The torque gauge A includes as a part of its structure an elongated arm 1 which is provided with an outer end portion 1' that is of increased width, as is shown to good advantage in Fig. 1. The portion 1' of the elongated arm 1 has formed therein and extended therethrough, an opening 2 which is of such shape that it will receive therein a blade of a propeller, the portion 1' of the arm 1 being passed over the propeller blade from its outer end to cause the propeller blade to extend through the opening 2. The elongated arm 1 may be formed from any suitable material, one such being plywood.

Figure 2:
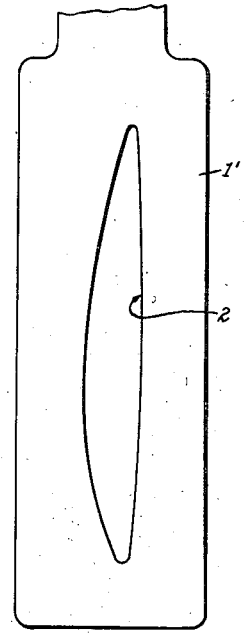
Fig. 2 is an edge elevation of a portion of the improved torque gauge.
Figure 2:
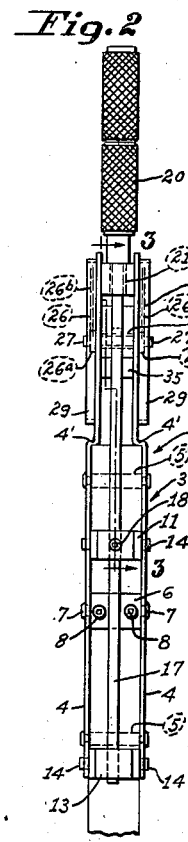

Supported by the elongated arm 1, at the end thereof opposite to the location of the wider end portion 1', is a head 3, said head being comprised of a pair of spaced plates 4 provided with offset portions 4' which causes the outer portion of the head at one side of the offset portions to be of less depth than the head portion at the opposite side of the offset portions. The plates 4 are secured together by transverse posts 5 which are provided with reduced, opposite end portions having annular shoulders at their inner ends that contact with the inner faces of the spaced plates 4, the reduced outer end portions of the posts being extended through apertures formed through the plates and the extreme outer end portions of said reduced portions being riveted over to securely fix the plates together in their proper spaced relation. The outer end portion of the narrower portion of the elongated arm 1 is extended between the wider spaced portions of the spaced plates 4, and the outer end face of said narrower arm portion abuts against the offset portions 4' of said plates, as is shown to good advantage in Figs. 1, 2, and 3. Also, a side edge of the portion of the elongated arm which is disposed between the plates 4 contacts with the posts 5 previously referred to herein.

Figure 5:
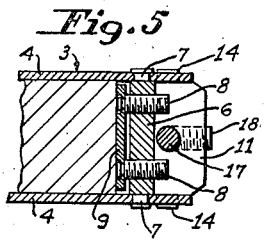
Fig. 5 is an enlarged, fragmentary section taken on line 5—5 of Fig. 1.

At the side of the head 3 opposite to the side thereof adjacent to which the posts 5 are located, the structure includes means for securing the head to the elongated arm 1. This securing means comprises a bar 6 which extends transversely of the head, the opposite end faces of said bar contacting with the inner faces of the opposed, spaced plates 4, and extensions 7, which are projected outwardly from the opposite end faces of the bar 6, extend through the apertures formed in the opposed plates 4 and are riveted over at their outer ends to secure the bar to the spaced plates in a fixed position with respect thereto (see Fig. 5). The bar 6 has formed therethrough a pair of screwthreaded openings in which a pair of set screws 8 are supported, said set screws being provided with non-circular apertures which are formed in the outer portions of the set screws and are adapted to receive a suitable tool for rotating the set screws. The inner ends of the set screws 8 contact with pads 9 formed of metal or other suitable material, said pads being in the form of a disk and being forced into close contacting engagement with the adjacent edge face of the elongated arm by the set screws 8 upon inward adjustment of said set screws. It is to be noted that the force applied to the portion of the arm 1, which is disposed between the plates 4 of the head 3, by the set screws 8, jambs said arm portion against the posts 5 with the result that the arm portion is securely gripped at three triangularly related points by the posts 5 and the securing means which includes the set screws 8. The result of this situation is that the arm 1 and head 3 of the apparatus are very securely attached together.

Forming parts of the structure of the head 3 of the improved apparatus is a plurality of blocks 10, 11, 12, and 13, said blocks being of like construction and arrangement except for a slight difference between the blocks 10 and 11 and the blocks 12 and 13 which will be hereinafter referred to. The blocks 10 and 12 are arranged in alined relation adjacent to one side of the head 3 of the apparatus, while the blocks 11 and 13 are arranged in alined relation adjacent to the opposite side of said head. Each of the blocks 10, 11, 12, and 13 comprises a body portion which is disposed between the spaced plates 4 of the head of the apparatus with opposite side faces of said body portion contacting with inner face portions of said plates 4. Also, each block is provided with trunnions 14 which extend outwardly from the body portion thereof in opposite directions and these trunnions are disposed in openings formed through the spaced plates 4 so as to provide for the pivotal support of the block relative to the plates. Likewise, each of the blocks 10, 11, 12, and 13, has an opening 15 formed vertically therethrough (Fig. 3), the openings 15 of the blocks 10 and 11 being alined with the openings 15 of the blocks 12 and 13.

Figure 4:
Fig. 4 is an enlarged, fragmentary section taken on line 4—4 of Fig. 1.
Figure 4:
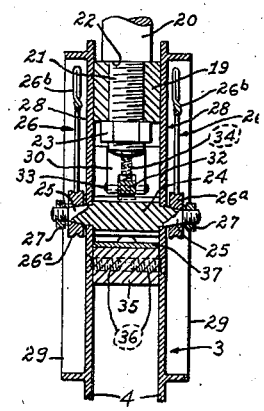
Figure 3:
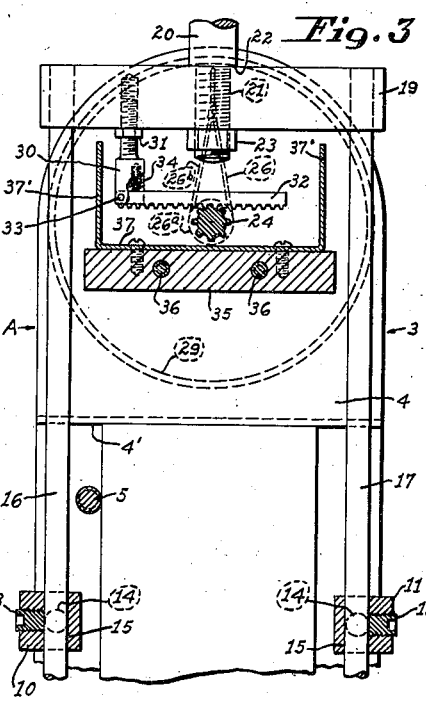
Fig. 3 is an enlarged, fragmentary section taken on line 3—3 of Fig. 2.

The blocks 10 and 12 support an elongated rod 16, formed of steel or other material possessing the required resiliency, and the blocks 11 and 13 support a similar elongated rod 17. Portions of the rods 16 and 17 are disposed in the openings 15 of the blocks by which they are supported, said rods being rigidly secured to the blocks 10 and 11, respectively, by set screws 18 which are screwthreadedly seated in screwthreaded openings formed in said blocks 10 and 11 and which are adapted for adjustment into binding engagement with said rods. The rods 16 and 17 extend loosely through the openings 15 of the blocks 12 and 13 without being secured to said blocks and it is in this regard that the constructions of the blocks 12 and 13 differ from that of the blocks 10 and 11 as referred to above, inasmuch as the blocks 10 and 11 are provided with set screws for securing the rods to said blocks, while the blocks 12 and 13 include no such set screws. At their outer ends the elongated rods 16 and 17 have fixed thereto, and are joined by, a transversely extended member 19 which is of such width that it fits loosely between the plates 4 of the head of the apparatus, as shown to the best advantage in Fig. 4. This member 19 has fixed thereto and extended therefrom a handle 20 which preferably is provided with a knurled grip, said handle being provided with a screwthreaded shank 21 that extends from a shoulder 22 (Fig. 3). The handle is secured to the member 19 by having the shank 21 thereof extended through an opening formed through said member 19 with the shoulder 22 in contact with the top face of the member 19, and by applying a nut 23 to the lower end portion of the shank so that said nut engages the lower face of said member 19.

Supported by the spaced plates 4 of the head 3 of the apparatus A, for rotation about its axis, is an elongated pinion 24. The pinion 24 is disposed between the spaced plates 4 of the head of the apparatus and said pinion is provided with tapered trunnions 25 which extend outwardly in opposite directions from the opposite ends of the pinion through apertures formed through the spaced plates 4, the walls of said apertures supporting said trunnions for rotation. Mounted fixedly on the trunnions 25 is a pair of indicators 26, said indicators comprising each a hub portion 26a which is provided with a bore that is tapered in accordance with the taper of the trunnion by which it is supported, and an arm 26b which is fixed to and extended from said hub. Each trunnion 25 of the pinion 24 is screwthreaded at its outer end portion, and mounted on this screwthreaded portion is a nut 27 which is screwed inwardly of the screwthreaded portion of the trunnion to force the tapered wall of the bore of the hub of the associated indicator into binding engagement with the tapered surface of the trunnion so as to securely fix the associated indicator 26 to the trunnion. The indicator arms 26b are adapted to move relative to outer face portions 28 of the opposed plates 4 of the head 3 of the apparatus, said face portions serving as dials being provided with graduations indicating inch-pounds, and being enclosed within an annular, outstanding flange 29.

Extended inwardly from the transverse member 19 located at the outer ends of the rods 16 and 17, is a supporting element 30. This supporting element includes a screwthreaded shank portion which is screwed into a screwthreaded opening formed in the transverse member 19, and an enlarged, bifurcated head portion at the lower end of said shank, as the apparatus is illustrated in Fig. 3, a lock nut 31 being provided to lock the element 30 against unintended rotation relative to the transverse member 19. Supported by the head portion of the supporting element 30 is a rack 32 whose teeth mesh with the teeth of the pinion 24. An end portion of the rack 32 is disposed between the spaced portions of the bifurcated head portion of the element 30, and said end portion of said rock is secured to said head portion of said element by a pivot pin 33 which provides for pivotal movement of said rack with respect to said head portion of the element 30. Additionally, the head portion of the supporting element 30 is provided with a cavity in which is arranged a compression coil spring 34 (Fig. 3), this coil spring contacting at one of its ends with a wall at the closed end of the cavity and at its opposite end with the rack 32. The coil spring 34 exerts such pressure against the rack 32 that the teeth of said rock are maintained in proper engagement with the teeth of the pinion 24 at all times.

Secured in place between the spaced plates 4 of the head 3 of the apparatus, at a point adjacent to the location of the pinion 24, is a strip of material 35, said strip of material being fixed to the spaced plates by suitable fastening elements 36 which extend through alined apertures formed through said strip of material and through said spaced plates. The strip of material 35 has secured thereto a U-shaped member 37 having upstanding portions 37' that serve as abutments which limit movement of parts of the apparatus during use thereof, as will be presently pointed out herein.

In the use of the improved apparatus disclosed herein, the apparatus is applied to a blade of a propeller by causing the blade to be extended through the opening 2 of the arm of the apparauts. The propeller is held against rotation, and the operator testing the torque of the blade of the propeller will grasp the handle 20 of the appartus and with the aid of the apparatus will apply to the propeller blade force which tends to turn the propeller blade about its axis. The resilient rods 16 and 17 will yield as this force is applied to the propeller blade, in accordance with the friction existing at the bearings of the propeller blade, and as a result of such yielding movement of the rods 16 and 17 the rack 32 will be moved relative to the pinion 24 so as to rotates said pinion and cause the indicators 26 to move with respect to the graduations on the opposite face portions 28 of the spaced plates of the head portion of the apparatus. In this manner the torque required to turn the blade with respect to its bearings is indicated by the apparatus at the dials thereof in inch-pounds, and such reading may be made at either side of said apparatus. Also, because the dials of the apparatus are graduated in opposite directions from a neutral or zero point, the apparatus may be employed to apply turning force to a propeller blade in either of opposite directions. The upstanding portions 37' of the U-shaped member 37 (Fig. 3) limit flexing movement of the rods 16 and 17 so that said rods may not be forced beyond their limits of resiliency, such excessive movement of said rods being prevented by the element 39 or the opposite end of the rack 32 coming into abutting engagement with one or the other portion 37' of the member 37. Also, because of the particular arrangement of the member 19 in association with end portions of the resilient rods 16 and 17, the handle 20 is maintained in parallel relation with respect to the major axis of the elongated arm 1 at all times during flexing movement of said resilient rods, thus facilitating application of force to the apparatus which tends to flex the resilient rods and thereby causes the apparatus to function.

I claim:

1. A torque gauge comprising an elongated structure adapted for engagement with an article to be tested with the aid of the torque gauge, indicating means associated with said elongated structure and which includes a movable indicator, a pair of spaced elongated resilient elements capable of being flexed during use of the torque gauge, a member joining said spaced elongated resilient elements at corresponding ends thereof, a handle associated with said member and adapted for use in applying flexing movement to said spaced elongated resilient elements, and means for transmitting movement of said spaced elongated resilient elements resulting from flexing thereof to said indicator so as to indicate by movement of said indicator the degree of flexing movement to which the spaced elongated resilient elements are subjected.

2. A torque gauge comprising an elongated structure adapted for engagement with an article to be tested with the aid of the torque gauge, indicating means associated with said elongated structure and which includes a movable indicator, a pair of spaced elongated resilient elements capable of being flexed during use of the torque gauge, a member joining said spaced elongated resilient elements at corresponding ends thereof, a handle associated with said member and adapted for use in applying flexing movement to said spaced elongated resilient elements, and means for transmitting movement of said spaced elongated resilient elements resulting from flexing thereof to said indicator so as to indicate by movement of said indicator the degree of flexing movement to which the spaced elongated resilient elements are subjected, the last-mentioned means comprising a pinion to which said indicator is fixed, and a rack which is supported by and is movable with said member and cooperatively engages said pinion so as to rotate the same.

3. A torque gauge comprising an elongated structure adapted for engagement with an article to be tested with the aid of the torque gauge, indicating means associated with said elongated structure and which includes a movable indicator, a pair of spaced elongated resilient elements capable of being flexed during use of the torque gauge, a member joining said spaced elongated resilient elements at corresponding ends thereof, a handle associated with said member and adapted for use in applying flexing movement to said spaced elongated resilient elements, and means for transmitting movement of said spaced elongated resilient elements resulting from flexing thereof to said indicator so as to indicate by movement of said indicator the degree of flexing movement to which the spaced elongated resilient elements are subjected, the last-mentioned means comprising a pinion to which said indicator is fixed, a rack which is supported by said member for pivotal movement with respect thereto and which is movable with said member, and spring means for maintaining said rack in cooperating engagement with said pinion so that movement of said rack will rotate said pinion.

4. A torque gauge comprising an elongated structure adapted for engagement with an article to be tested with the aid of the torque gauge, indicating means associated with said elongated structure and which includes a movable indicator, a pair of spaced elongated resilient elements capable of being flexed during use of the torque gauge, a member joining said spaced elongated resilient elements at corresponding ends thereof a handle associated with said member and adapted for use in applying flexing movement to said spaced elongated resilient elements, means for transmitting movement of said spaced elongated resilient elements resulting from flexing thereof to said indicator so as to indicate by movement of said indicator the degree of flexing movement to which the spaced elongated resilient elements are subjected, the last-mentioned means comprising a pinion to which said indicator is fixed, a rack which is supported by said member for pivotal movement with respect thereto and which is movable with said member, and spring means for maintaining said rack in cooperating engagement with said pinion so that movement of said rack will rotate said pinion, and abutment means for limiting movement of said spaced elongated resilient elements.

5. A torque gauge comprising an elongated arm adapted for engagement with an article to be tested with the aid of the torque gauge, and a head structure mounted on said arm at an end thereof, said head portion including indicating means provided with a movable indicator, a pair of spaced elongated resilient elements capable of being flexed with respect to said head structure during use of the torque gauge, pairs of spaced blocks supported by said head structure for pivotal movement and provided with openings through which said spaced elongated resilient elements extend, a member joining said spaced elongated resilient elements at corresponding ends thereof, a handle associated with said member and adapted for use in applying flexing movement to said spaced elongated resilient elements, and means for transmitting movement of said spaced elongated resilient elements resulting from flexing thereof to said indicator so as to indicate by movement of said indicator the degree of flexing movement to which the spaced elongated resilient elements are subjected.

6. A torque gauge comprising an elongated arm adapted for engagement with an article to be tested with the aid of the torque gauge, and a head structure mounted on said arm at an end thereof, said head portion including indicating means provided with a movable indicator, a pair of spaced elongated resilient elements capable of being flexed with respect to said head structure during use of the torque gauge, pairs of spaced blocks supported by said head structure for pivotal movement and provided with openings through which said spaced elongated resilient elements extend, clamping means for securing said spaced elongated resilient elements to the blocks of an associated pair of said blocks, a member joining said spaced elongated resilient elements at corresponding ends thereof, a handle associated with said member and adapted for use in applying flexing movement to said spaced elongated resilient elements, and means for transmitting movement of said spaced elongated resilient elements resulting from flexing thereof to said indicator so as to indicate by movement of said indicator the degree of flexing movement to which the spaced elongated resilient elements are subjected.

7. A torque gauge comprising an elongated arm adapted for engagement with an article to be tested with the aid of the torque gauge, and a head structure mounted on said arm at an end thereof, said head portion including indicating means provided with a movable indicator, a pair of spaced elongated resilient elements capable of being flexed with respect to said head structure during use of the torque gauge, pairs of spaced blocks supported by said head structure for pivotal movement and provided with openings through which said spaced elongated resilient elements extend, a member joining said spaced elongated resilient elements at corresponding ends thereof, a handle associated with said member and adapted for use in applying flexing movement to said spaced elongated resilient elements, means for transmitting movement of said spaced elongated resilient elements resulting from flexing thereof to said indicator so as to indicate by movement of said indicator the degree of flexing movement to which the spaced elongated resilient elements are subjected, and means for securing said head structure to said elongated arm.

CHARLES ADIN FOX.